United States Patent
Kale et al.

(10) Patent No.: US 12,555,024 B2
(45) Date of Patent: Feb. 17, 2026

(54) DYNAMIC DATA SELECTION FOR A MACHINE LEARNING MODEL

(71) Applicant: Oracle International Corporation, Redwood Shores, CA (US)

(72) Inventors: Someshwar Maroti Kale, Karnataka (IN); Vijayalakshmi Krishnamurthy, Sunnyvale, CA (US); Utkarsh Milind Desai, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 772 days.

(21) Appl. No.: 16/458,924

(22) Filed: Jul. 1, 2019

(65) Prior Publication Data

US 2020/0242511 A1 Jul. 30, 2020

(30) Foreign Application Priority Data

Jan. 30, 2019 (IN) .............................. 201941003803

(51) Int. Cl.
*G06N 20/00* (2019.01)
(52) U.S. Cl.
CPC .................................. *G06N 20/00* (2019.01)
(58) Field of Classification Search
CPC ........ G06N 20/00; G06N 3/044; G06N 3/045; G06N 5/01; G06N 7/01; G06N 20/10; G06N 3/082
See application file for complete search history.

(56) References Cited

U.S. PATENT DOCUMENTS

| | | | |
|---|---|---|---|
| 8,849,736 B2 | 9/2014 | Miranda et al. | |
| 8,868,516 B2 | 10/2014 | Laredo et al. | |
| 9,703,823 B2 * | 7/2017 | Daly | G06N 5/02 |
| 9,898,467 B1 | 2/2018 | Pitzel et al. | |

(Continued)

FOREIGN PATENT DOCUMENTS

| CN | 104679868 B | 9/2017 |
|---|---|---|
| CN | 108375808 A | 8/2018 |

(Continued)

OTHER PUBLICATIONS

Koychev et al., "Tracking Drifting Concepts by Time Window Optimisation", 2005, Research and Development in Intelligent Systems XXII SGAI 2005, pp. 46-59 (Year: 2005).*

(Continued)

*Primary Examiner* — Leonard A Sieger
(74) *Attorney, Agent, or Firm* — Potomac Law Group, PLLC (57) ABSTRACT

Embodiments implement a machine learning prediction model with dynamic data selection. A number of data predictions generated by a trained machine learning model can be accessed, where the data predictions include corresponding observed data. An accuracy for the machine learning model can be calculated based on the accessed number of data predictions and the corresponding observed data. The accessing and calculating can be iterated using a variable number of data predictions, where the variable number of data predictions is adjusted based on an action taken during a previous iteration, and, when the calculated accuracy fails to meet an accuracy criteria during a given iteration, a training for the machine learning model can be triggered.

20 Claims, 7 Drawing Sheets

(56) References Cited

U.S. PATENT DOCUMENTS

| | | | |
|---|---|---|---|
| 10,339,468 B1* | 7/2019 | Johnston | G06N 5/04 |
| 10,657,457 B1* | 5/2020 | Jeffery | G06N 20/00 |
| 2004/0158562 A1 | 8/2004 | Caulfield et al. | |
| 2010/0179930 A1 | 7/2010 | Teller et al. | |
| 2015/0310055 A1 | 10/2015 | Derstadt et al. | |
| 2016/0062493 A1* | 3/2016 | Beissinger | G06F 3/0481 |
| | | | 345/173 |
| 2016/0188574 A1* | 6/2016 | Homma | G06F 40/35 |
| | | | 704/9 |
| 2016/0371601 A1* | 12/2016 | Grove | G06N 20/00 |
| 2017/0323216 A1 | 11/2017 | Fano | |
| 2018/0197087 A1 | 7/2018 | Luo et al. | |
| 2019/0012575 A1 | 1/2019 | Xiao et al. | |
| 2019/0130303 A1* | 5/2019 | Bigaj | G06N 20/00 |
| 2020/0167669 A1* | 5/2020 | Lei | G06N 3/105 |

FOREIGN PATENT DOCUMENTS

| | | |
|---|---|---|
| CN | 109191030 A | 1/2019 |
| JP | 2018535492 A | 11/2018 |
| RU | 2672394 C1 | 11/2018 |

OTHER PUBLICATIONS

Klinkenberg et al., "Detecting Concept Drift with Support Vector Machines", ICML '00: Proceedings of the Seventeenth International Conference on Machine Learning, 2000, vol. 7 (2000), pp. 487-494 (Year: 2000).*

Hassani, "Concept Drift Detection of Event Streams Using an Adaptive Window", Jan. 6, 2019, retrieved from https://pure.tue.nl/ws/files/149896665/0230_dsm_ecms2019_0073.pdf (Year: 2019).*

Seeliger et al., "Detecting Concept Drift in Processes using Graph Metrics on Process Graphs", 2017, Proceedings of 9th International Conference on Subject-oriented Business Process Management, vol. 9 (2017), pp. 1-10 (Year: 2017).*

Bifet et al., "Learning from Time-Changing Data with Adaptive Windowing", 2007, Proceedings of the 2007 SIAM International Conference on Data Mining, vol. 2007, pp. 443-448 (Year: 2007).*

Estrada et al., "NSC: A New Progressive Sampling Algorithm", 2004, workshop on Machine Learning for Scienific data Analysis (IBERAMIA 2004), pp. 1-10 (Year: 2004).*

Vansteenwegen et al., "An iterated local search algorithm for the single-vehicle cyclic inventory routing problem", 2014, European Journal of Operational Research, vol. 237 No. 3, pp. 802-813 (Year: 2014).*

Choudhary et al., "On the Runtime-Efficacy Trade-off of Anomaly Detection Techniques for Real-Time Streaming Data", 2017, arXiv, v1, pp. 1-14 (Year: 2017).*

Widmer et al., "Learning in the Presence of Concept Drift and Hidden Contexts", 1996, Machine Learning, vol. 23, pp. 69-101 (Year: 1996).*

Provost et al., "Efficient Progressive Sampling", 1999, Proceedings of the fifth ACM SIGKDD international conference on Knowledge discovery and data mining, vol. 5 (1999), pp. 23-32 (Year: 1999).*

International Search Report issued in the corresponding International Application No. PCT/US2019/040693 mailed on Oct. 15, 2019.

Kumar et al., "Self-Paced Learning for Latent Variable Models", Advances in Neural Information Processing Systems 23, Jan. 1, 2010 (Jan. 1, 2010), pp. 1189-1197, XP055239017.

Losing et al., "Incremental on-line learning: A review and comparison of state of the art algorithms", Neurocomputing, Elsevier, Amsterdam, NL, vol. 275, Sep. 28, 2017 (Sep. 28, 2017), pp. 1261-1274, XP085310253.

Raza et al., Learning with Covariate Shift-Detection and Adaptation in Non-Stationary Environments: Application to Brain-Computer Interface, 2015 International Joint Conference on Neural Networks (IJCNN), IEEE, Jul. 12, 2015 (Jul. 12, 2015), pp. 1-8, XP033222223.

Dai et al., "Improving Data Quality Through Deep Learning and Statistical Models", Advances in Intelligent Systems and Computing, Jul. 2018.

Gosain et al., "Neural Network Approach to Predict Quality of Data Warehouse Multidimensional Model", Proc. of Int. Conf. on Advances in Computer Science, pp. 241-244, 2010.

Gudivada et al., "Data Quality Considerations for Big Data and Machine Learning: Going Beyond Data Cleaning and Transformations", International Journal on Advances in Software 10.1 (2017), pp. 1-20.

Mahankali, "The machine learning approach to data quality", Data, Analytics & Artificial Intelligence, Wipro, retrieved from https://www.wipro.com/en-IN/analytics/the-machine-learning-approach-to-data-quality/ on May 16, 2019.

* cited by examiner

DYNAMIC DATA SELECTION FOR A MACHINE LEARNING MODEL

FIELD

The embodiments of the present disclosure generally relate to dynamic data selection for a machine learning model.

BACKGROUND

Artificial Intelligence ("AI") implementations have generated tangible benefits, from supervised learning based data predictions to facial recognition. However, challenges that surround AI remain, such as implementation specific issues that often vary across different systems. Training an AI model can be resource intensive and, at times, disruptive. In addition, the retraining of an AI model can impact both model accuracy and system efficiency. Accordingly, a tool that can balance resource usage with performance of an artificial intelligence model can generate tangible benefits for users of the tool.

SUMMARY

The embodiments of the present disclosure are generally directed to systems and methods for dynamic data selection for a machine learning model that substantially improve upon the related art.

A number of data predictions generated by a trained machine learning model can be accessed, where the data predictions include corresponding observed data. An accuracy for the machine learning model can be calculated based on the accessed number of data predictions and the corresponding observed data. The accessing and calculating can be iterated using a variable number of data predictions, where the variable number of data predictions is adjusted based on an action taken during a previous iteration, and, when the calculated accuracy fails to meet an accuracy criteria during a given iteration, a training for the machine learning model can be triggered.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments perform dynamic data selection for a machine learning model. In some embodiments, training data can be used to train a machine learning model (e.g., via supervised learning). The trained model can then be used to generate data predictions based on input data. At times, a trained machine learning model can be updated, for example by retraining the model or updating the training.

In some embodiments, an accuracy metric can be used to trigger retraining or updated training. For example, some implementations of a trained machine learning model generate data predictions of a data point that is observed some time in the future. As such, past data predictions can include corresponding observed data points. An accuracy metric based on these two values can be used to trigger retraining or updated training. For example, the accuracy metric can be compared to an accuracy criteria, and based on the comparison, training can be triggered.

In some embodiments, the number of past data predictions and corresponding observed data point pairs can influence the accuracy metric. For example, a set of these data point pairs can be generated as observed data becomes available. The accuracy determination can be dependent on the number of these data point pairs that are selected. A large number of data point pairs can dilute the significance of any particular subset of these data points. For example, when a month of data point pairs is used to determine accuracy, the last week of data point pairs is diluted by the other days of the month. In another example, when two weeks of data point pairs is used to determine accuracy, the last week of data point pairs has great significance to the accuracy metric.

In some implementations, where a first number of data point pairs is smaller than a second number of data point pairs, an accuracy metric based on the first number is more likely to trigger retraining or updated training than an accuracy metric based on the second number. In other words, in some implementations a smaller number of data point pairs is more likely to generate an accuracy metric that fails to meet the accuracy criteria, and thus trigger retraining or updated training.

The training of a machine learning model can be resource intensive, and thus selectively retraining or updating the training of a machine learning model can balance accuracy with resource efficiency and practicality. Embodiments iteratively calculate an accuracy metric using a variable number of data point pairs, and retraining or updated training can be triggered at a given iteration when the accuracy metric fails to meet an accuracy criteria.

For example, at a given iteration, the number of data point pairs can be based on the previous number of data point pairs (e.g., used in the previous iteration), a factor value (e.g., a dynamic value that is adjusted over iterations), and the status of the last retraining or updated training (e.g., whether the model was retrained or updated training took place in the previous iteration). Accordingly, over the iterations, the number of data point pairs that are used to assess accuracy changes, and thus the likelihood of triggering retraining or updated training changes. This configured likelihood improves the implementation as a whole by balancing prediction accuracy with resource usage and system disruption.

For example, some traditional implementations provide for an option of a fixed number of data point pairs that are used to calculate accuracy. However, in these instances the accuracy calculated is general over the implicit feedback evaluation cycle or iterations. A dynamic selection of points, as described in embodiments, provides for flexibile and selective accuracy calculations, which leads to enhanced machine learning implementations. These improvements to accuracy calculations can generate enhanced training decisions and provide for more effective resource utilization.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
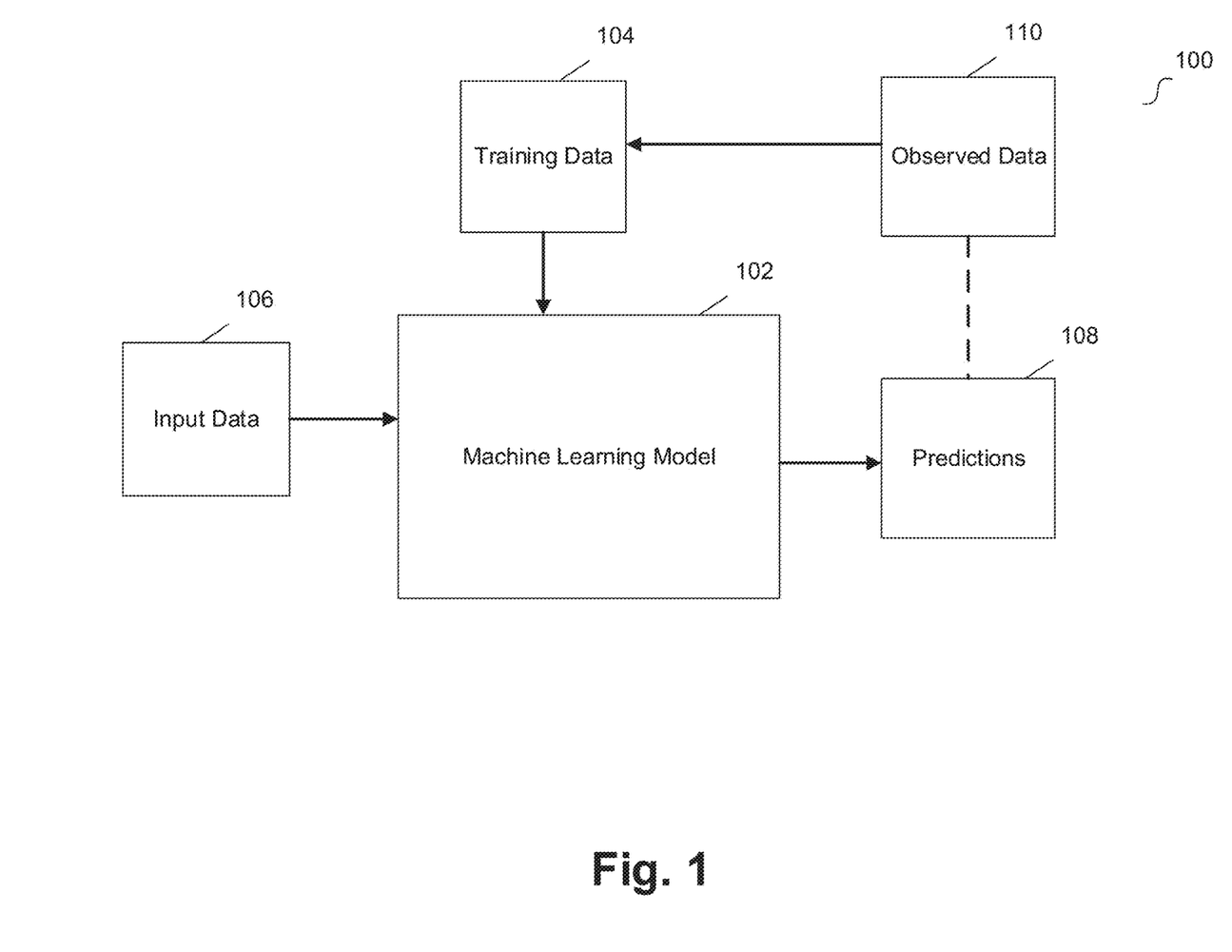
FIG. 1 illustrates a system for dynamic data selection for a machine learning model according to an example embodiment.

FIG. 1 illustrates a system for dynamic data selection for a machine learning model according to an example embodiment. System 100 includes machine learning model 102, training data 104, input data 106, predictions 108, and observed data 110. In some embodiments, machine learning model 102 can be a designed model that includes one or more machine learning elements (e.g., a neural network, support vector machine, Bayesian network, and the like). Training data 104 can be any set of data capable of training machine learning model 102 (e.g., a set of features with corresponding labels, such as labeled data for supervised learning). In some embodiments, training data 104 can be used to train machine learning model 102 to generate a trained machine learning model.

In some embodiments, input data 106 (e.g., an input set of features) can be input to the trained machine learning model to generate predictions 108. In some implementations, predictions 108 can represent observable data points. Accordingly, at a point in time, a given prediction within predictions 108 can include an observed data point that corresponds to the given prediction. In other words, a given observed data point within observed data 110 can correspond to the data that was attempted to be predicted by a given prediction within predictions 108.

For example, a trained machine learning model may be configured to predict the level of gas in a vehicle over time. Accordingly, a prediction generated by this trained model can include a gas level at a point in time in the future. In the future at the point in time that corresponds to the prediction, the actual gas level of the vehicle can be observed (e.g., retrieved and stored). The predicted gas level at the point in time can be compared to the observed gas level at the point in time to arrive at an accuracy calculation.

In an embodiment, predictions 108 and observed data 110 can include data point pairs that represent a past data prediction and a corresponding observed data point. Embodiments perform dynamic selection of these data point pairs when calculating an accuracy for machine learning model 102. For example, a dynamic number of these points can be taken at various iterations to assess the accuracy of machine learning model 102, and if the accuracy fails to meet a criteria, retraining or updated training of machine learning model 102 can be triggered. For example, observed data 110 can be used to update training data 104 as a part of the retraining or updated training. In an embodiment, once retraining or updated training of machine learning model 102 takes place, the accuracy of the newly trained model can be iteratively assessed.

Figure 2:
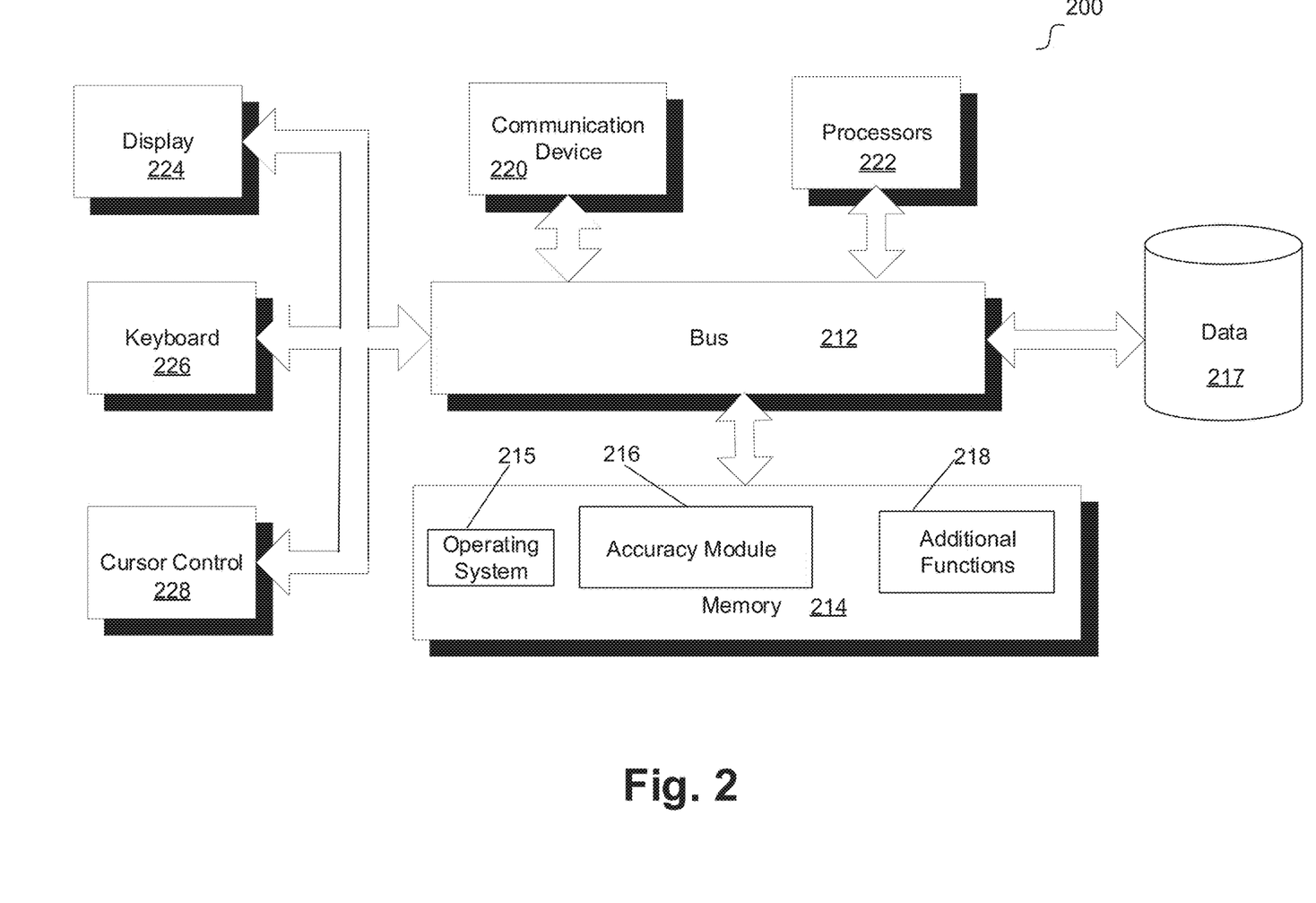
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, prediction module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, an accuracy module 216 that implements dynamic data selection for a machine learning model and all other functionality disclosed herein, as well as other applications modules 218. Operating system 215 provides operating system functionality for system 200. In some instances, accuracy module 216 may be implemented as an in-memory configuration. In some implementations, when system 200 executes the functionality of accuracy module 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Cloud Infrastructure, Oracle® Cloud Platform, Oracle® Cloud Applications, for example. Accuracy module 216, other applications module 218, and any other suitable component of system 200 can include various modules of Oracle® IoT Analytics, Oracle® Data Science Cloud, Oracle® Customer Experience Cloud, Oracle® Enterprise Resource Planning Cloud, Oracle® Manufacturing Cloud, other adaptive intelligence Oracle® applications, the data science toolkit of any suitable Oracle® product or service, or any other suitable product or service.

A database 217 is coupled to bus 212 to provide centralized storage for modules 216 and 218 and to store, for example, data received planning module 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component. Further, when implemented to execute functionality disclosed herein, system 200 is a special purpose computer, specially adapted to provide demand forecasting.

Embodiments are directed to the dynamic selection of a number of data point pairs used to calculate the accuracy of a trained machine learning model. For example, an implicit feedback evaluator (e.g., a module of a data science toolkit system, such as an Oracle® data science toolkit system) can periodically evaluate model performance and, based on accuracy, can trigger training if the model performance fails to meet a criteria (e.g., has an accuracy metric that fails to meet a criteria). In some embodiments, the algorithm uses an initial number of data point pairs and then increases/decreases this number based on the action taken in the last iteration (e.g., based on whether the last iteration triggered retraining).

For example, at times, a data science toolkit (e.g., from Oracle® IoT Analytics), is used to take corrective action automatically when trained model performance fails to meet standards (e.g., has an accuracy that does not meet a criteria). Some data science toolkit providers use an accuracy calculation mechanism to measure model performance. However, this accuracy is based on the number of data point pairs used to calculate the accuracy. Embodiments of an implicit feedback evaluator (e.g., a module in a data science toolkit system) periodically evaluate the trained model performance and take the appropriate action (e.g., retraining/updated training of the machine learning model, and the like) automatically whenever performance is outside certain tolerance levels. Data point selection can play a role in this evaluation.

The selection of fixed data points provides a static chance of retraining or updated training in an implicit feedback evaluation iteration since the accuracy calculation is dependent on the number of data points considered. Based on the dynamic selection of data points, embodiments include some iterations with a reduced chance of retraining while others can have an increased chance of retraining. Prediction training can be a highly resource intensive operation, and thus embodiments help to optimally use computing/cluster resources.

To illustrate how the selection of a number of data points impacts the accuracy calculation consider the following scenario. A Car Rental Company plans to use an Internet of Things ("IoT") asset monitoring application (e.g., Oracle® IoT Asset Monitoring Application) to manage their cars. The cars can be equipped with sensors (e.g., IoT devices) that can provide a current pulse (e.g., measurement value) of the car at specified intervals.

In an embodiment, as a user of the asset management application, Car Rental Company may be able to create the asset type as car with some device models. For example, consider that there is a device model created for FuelTank with the attributes: fuelLevel, temperature, etc. In an embodiment, the company may want to track the fuelLevel of the car per hour and create a metric/key performance indicator ("KPI"): "Track the AVG (fuelLevel) HOURLY".

In some embodiments, the company may also want to predict the future fuelLevel readings, and can create PREDICTION with "predict AVG (fuelLevel) for next day". For example, a machine learning model can be trained that will be used to predict the AVG (fuelLevel) for the next day. In some embodiments, seven days after training/deploying the machine learning model, an accuracy check can be used to determine accuracy of the trained machine learning model. For example, the accuracy calculation can be 1–average relative error, where average relative error is:

$$\frac{\sum_{i=1}^{n} |y_i - x_i|/x_i}{n}$$

Here, "xi" can be the actual value of the quantity being predicted, "yi" can be the prediction, and "n" can be the number of different times for which the variable is predicted. Any other suitable accuracy metric may be used. Consider that 5 data point pairs may be available for accuracy evaluation, however 3 are selected to evaluate accuracy:

| Datapoint Sequence | timestamp | kpi(actual value) | prediction(predicted value) |
| --- | --- | --- | --- |
| datapoint-1 | t1 | 10 | 15 |
| datapoint-2 | t2 | 15 | 20 |
| datapoint-3 | t3 | 20 | 24 |
| datapoint-4 | t4 | 20 | 30 |
| datapoint-5 | t5 | 10 | 15 |

-continued

| Sampled 3 points—Datapoint Sequence | timestamp | kpi(actual value) | prediction(predicted value) |
|---|---|---|---|
| datapoint-1 | t1 | 10 | 15 |
| datapoint-2 | t2 | 15 | 20 |
| datapoint-3 | t3 | 20 | 24 |

In an embodiment, using the above noted accuracy formula, the three data points will have the error abs(10−15)/10=0.5, abs(15−10)/15=0.33, and abs(20−24)/20=0.2, the summation and corresponding division by "n" arrives at (0.5+0.33+0.2)/3=0.34, and the 1−absolute relative error arrives at 1−0.34=0.66

Consider if four data points were sampled rather than three to calculate algorithm accuracy.

| Datapoint Sequence | timestamp | kpi(actual value) | prediction(predicted value) |
|---|---|---|---|
| datapoint-1 | t1 | 10 | 15 |
| datapoint-2 | t2 | 15 | 20 |
| datapoint-3 | t3 | 20 | 24 |
| datapoint-4 | t4 | 20 | 30 |

In an embodiment, using the above noted average relative error formula, the four data points will have the error abs(10−15)/10=0.5, abs(15−10)/15=0.33, abs(20−24)/20=0.2, and abs(20−30)/20=0.5, the summation and corresponding division by "n" arrives at (0.5+0.33+0.2+0.5)/4=0.38, and the 1−absolute relative error arrives at 1−0.38=0.62. In some embodiments, instead of pairs, the data points can include a larger number of values for error calculation.

This scenario demonstrates how accuracy calculation is dependent on the selection of the number data points. Selecting this number dynamically (e.g., time to time) mitigates the risk of frequent retraining as well as retraining whenever there is drastic change, among other benefits.

Figure 3A:
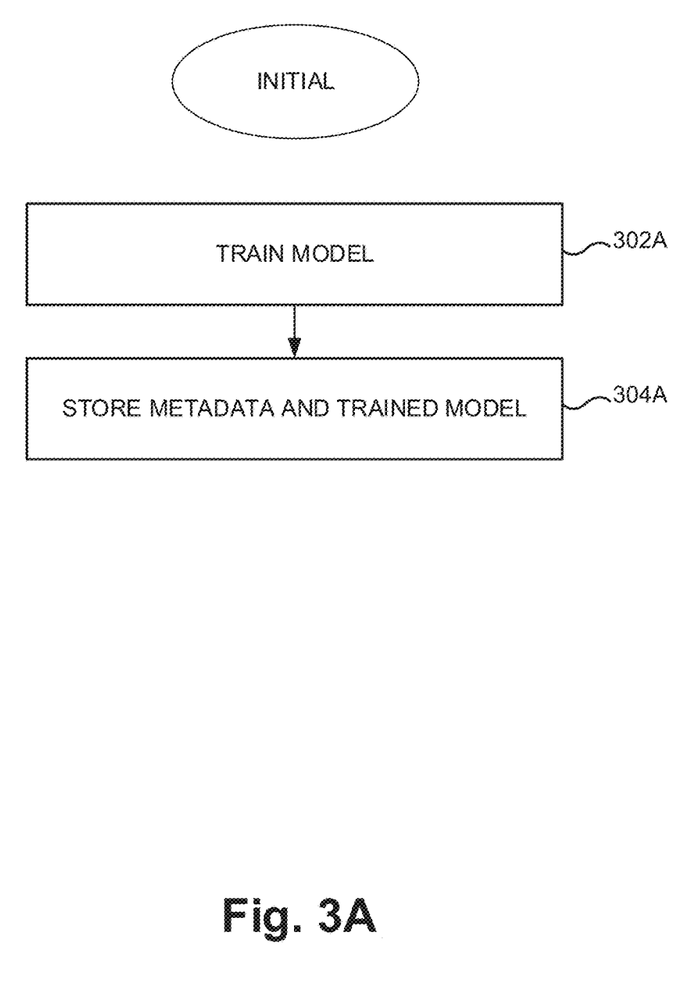
FIGS. 3A-3C illustrate flowcharts for dynamic data selection for triggering training of a machine learning model according to an example embodiment.
Figure 3B:
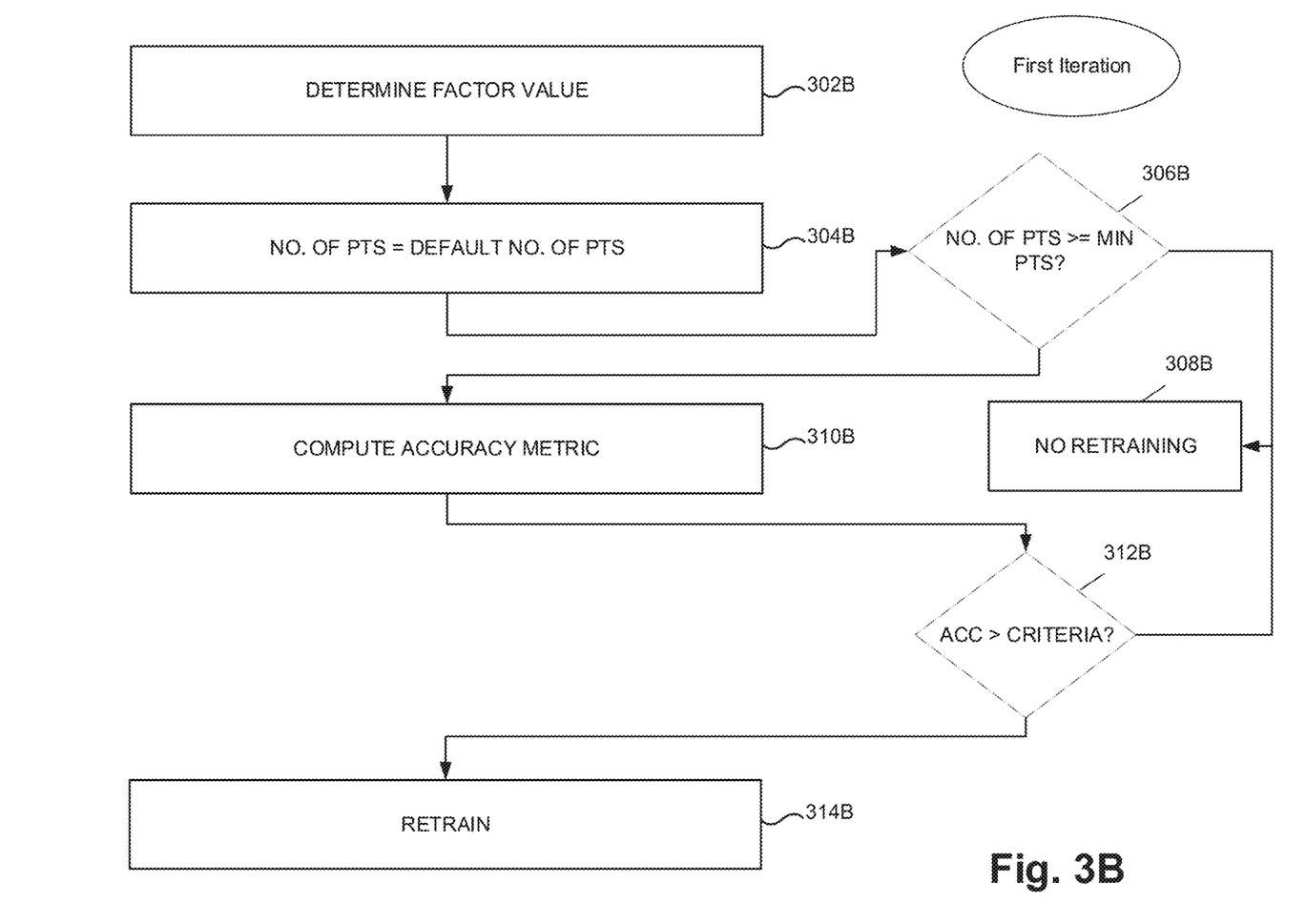
Figure 3C:
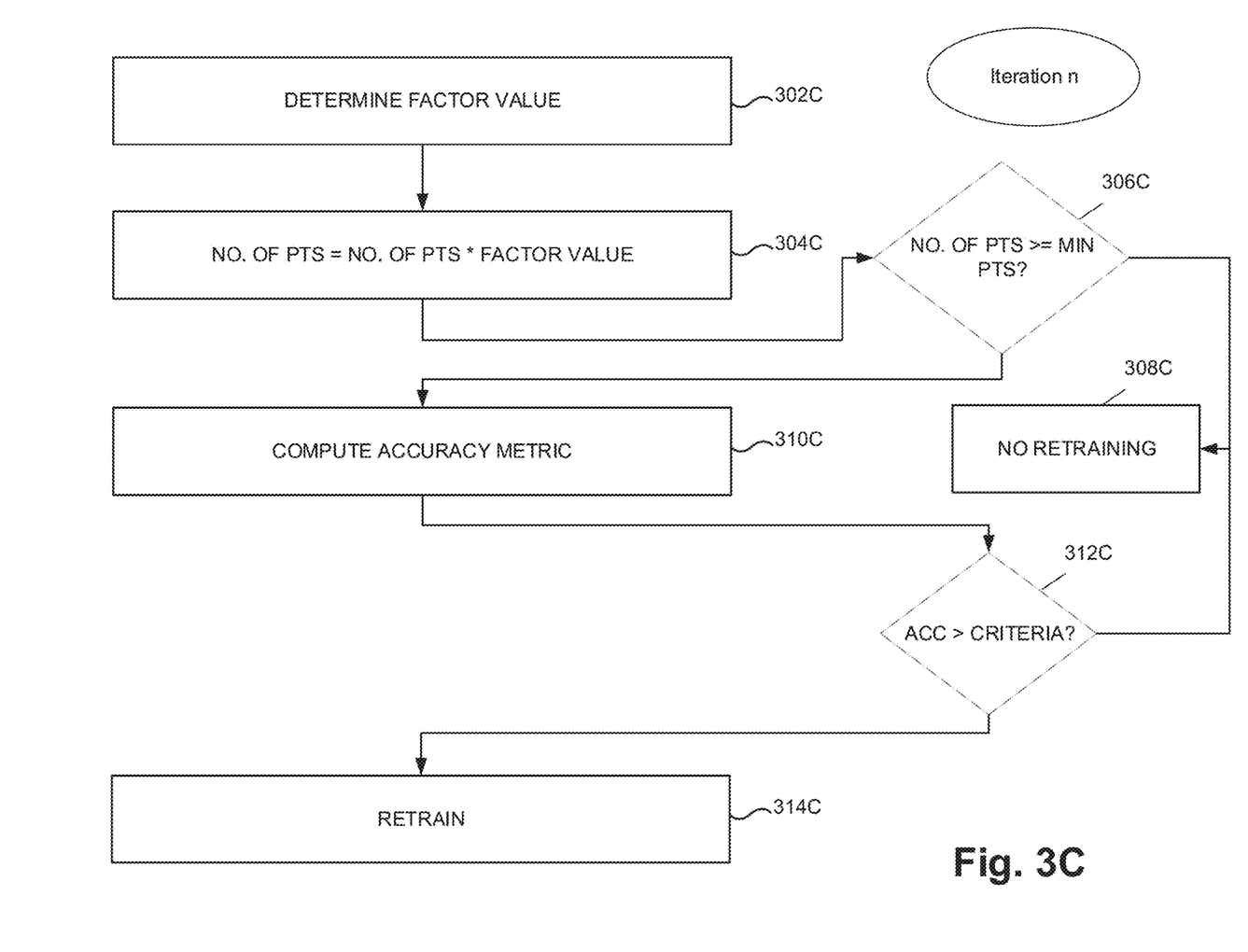

FIGS. 3A-3C illustrate flowcharts for dynamic data selection for triggering training of a machine learning model according to an example embodiment. In some embodiments, the functionality of FIGS. 3A-3C, and FIG. 4 below, is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 3A-3C and 4 can be performed by one or more elements of system 200 of FIG. 2.

In some embodiments, a machine learning model can be designed, trained and stored. At 302A of FIG. 3A, the machine learning model can be trained. Referring back to FIG. 1, machine learning model 102 can be trained using training data 104.

The design of machine learning model 102 can include any suitable machine learning model components (e.g., a neural network, support vector machine, specialized regression model, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some embodiments, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some embodiments, machine learning model 102 can be multiple models stacked, for example with the output of a first model feeding into the input of a second model. Some implementations can include a number of layers of prediction models. In some embodiments, features of machine learning model 102 can also be determined. For example, feature engineering can be used to generate a set of features implemented by one or more machine learning models.

In some embodiments, the design of machine learning model 102 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Embodiments include implementing various tuning configurations (e.g., different versions of the machine learning model and features) while training in order to arrive at a configuration for machine learning model 102 that, when trained, achieves desired performance (e.g., performs predictions at a desired level of accuracy, run according to desired resource utilization/time metrics, and the like).

In some embodiments, retraining and updating the training of the machine learning model can include training the model with updated training data. For example, the training data can be updated to incorporate observed data, or data that has otherwise been labeled (e.g., for use with supervised learning).

At 304A, the trained model and corresponding metadata can be stored. For example, machine learning model 102 can be trained, and the resultant trained machine learning model can be stored, in some implementations along with metadata about the model. For example, the stored metadata can be a number of points used for accuracy calculation (e.g., the default value, or a number generated by performing iterations), the factorValue (e.g., the default value, such as 2, or a computed value after performing iterations), the modelAccuracy, such as the accuracy as calculated by embodiments disclosed, and the like.

In some embodiments, a feedback cycle or evaluation determination (e.g., iteration) for the trained machine learning model can be performed after a period. For example, the period can be a predetermined quantity, such as a period of time (e.g., hours, days, a week, two weeks, a month, a quarter, and the like) or a predetermined amount of observed data (e.g., 30 accessible data point pairs for evaluation, 50 points, hundreds of points, thousands of points, and the like). The period for performing iterations of the algorithm can be dependent on the particular implementation, the rate at which data points are observed, the rate at which accuracy decreases, and other factors.

FIG. 3B illustrates a first iteration of an evaluation cycle. At 302B, a factor value can be determined. For example, a default factor value can be determined (e.g., 2, 3, or any other suitable number). In some implementations, the default factor value may be dependent on implementation specifics, and any suitable default factor value can be implemented.

At 304B, a number of data points can be selected. For example, an initial selection of a default number from the available data point pairs (e.g., 50% of the data points available from the trained model creation date) can be determined. The default number can be any other suitable percentage or number, and in some embodiments can also be implementation dependent. In an embodiment, the following formula can be used to determine a default number of data points: number of data points=0.5·(currentTime−trainedModelCreatedTime)/smallestKpiFreqn. For example, if a key performance indicator ("KPI") is hourly and the period is seven days, number of data points can be 0.5·(7 days/1 hour)=0.5·168=84.

At 306B, it can be determined whether a number of data points meets a criteria, such as a threshold number of data points. For example, a threshold number of data points may be 30, and in some instances 30 data points may not have been generated based on the observed data since training of the model (e.g., when the period is defined by time, the number of data points generated may be variable). Any suitable criteria or threshold number of data points can be used. At 308B, when the number of data points does not meet the criteria (e.g., is less than or equal to a minimum number of data points), no retraining or updated training is triggered during the iteration.

At 310B, when the number of data points does meet the criteria (e.g., is greater than or equal to the minimum number of data points), an accuracy metric can be computed. Referring back to FIG. 1, the accuracy metric can be based on a comparison between the predicted data points from predictions 108 and the corresponding observed data points from observed data 110. For example, consider that a trained machine learning model can generate a data prediction and that a corresponding data point can be later observed, thus generating a data point pair that can be used for accuracy calculation. Example accuracy metrics can include an average relative error, 1−the average relative error, mean absolute percentage error, mean absolute error, root-mean-square deviation, and the like.

In some embodiments, the trained model can be a logistic model, and accuracy may be based on more than a single element. An accuracy metric such as the F1 score can be implemented. For example, F1 can be a function of the precision (e.g., positive predictive value) and recall (e.g., sensitivity) of the model. Precision can be a ratio of true positive (e.g., predicted positive by the model that corresponds to a labeled positive) over total positives for the model (e.g., true positives+false positives for the model). Recall can be a ratio of true positives over total labeled positives (e.g., true positives+false negatives for the model). Any other suitable precision and recall definitions can similarly be implemented. The F1 score function can be F1=2×(precision×recall)/(precision+recall). Any other suitable definition for the F1 score can be implemented. Some embodiments implement other suitable logistic model accuracy metrics.

At 312B, it can be determined whether the calculated accuracy metric meets an accuracy criteria. For example, it can be determined whether the accuracy calculated for the trained machine learning model is greater than a threshold accuracy (e.g., 25%, 50%, 75%, and the like). Some embodiments can calculate the accuracy metric as an error metric, and thus the error metric can be compared to an error criteria to determine whether the error is greater than a threshold.

At 308B, when the accuracy metric meets the accuracy criteria (e.g., the accuracy metric is greater than an accuracy threshold or an error metric is less than the error threshold), no retraining or updated training is triggered in the iteration. At 312B, when the accuracy metric fails to meet the accuracy criteria (e.g., the accuracy metric is less than an accuracy threshold or an error metric is greater than the error threshold), retraining or updated training is triggered. For example, training data 104 can be updated with observed data 110, and machine learning model 102 can be retrained or an updated training can be performed. In some embodiments, if retraining is triggered, machine learning model 102 is trained and stored. In some implementations, the factor value and number of points can also be saved along with the trained model information (e.g., trained model and metadata). In some embodiments, the implicit feedback will also get recorded to feedback persistent storage.

FIG. 3C illustrates an "n" iteration of the evaluation cycle. At 302C, a factor value can be determined. For example, the factor value can be based on the factor value at the "n−1" iteration. In some embodiments, the "n−1" factor value can be multiplied by a static value (e.g., 0.95, 0.90, 0.85, and the like) to determine the factor value for the "n" iteration. Any other suitable factor value determination can be used.

At 304C, the number of data points can be selected. For example, the determined number of data points can be based on the factor value at the "n" iteration and an action taken at the "n−1" iteration (e.g., retraining or no retraining). In some embodiments, the number of data points at the "n−1" iteration can be multiplied by the factor value when retraining was triggered in the "n−1" iteration and the number of data points at the "n−1" iteration can be divided by the factor value when retraining was not triggered in the "n−1" iteration. In other words, the number of points can be increased when there was a training in last iteration and decreased when there was not training in the last iteration.

Accordingly, for a current iteration, the number of points used in last iteration can be increased or decreased based on the last action taken. In some embodiments, when retraining was performed in the last iteration, the number of data points can be increased by multiplying it with a factor value and the number of data points can be decreased by dividing it with a factor value.

In some embodiments, the functionality of 306C, 308C, 310C, 312C, and 314C can be similar to the functionality of 306B, 308B, 310B, 312B, and 314B. For example, at 306C it can be determined whether a number of data points meets a criteria, such as a threshold number of data points. At 308C, when the number of data points does not meet the criteria (e.g., is less than or equal to the minimum number of data points), no retraining or updated training is triggered during the iteration.

At 310C, when the number of data points does meet the criteria (e.g., is greater than or equal to the minimum number of data points), an accuracy metric can be computed. At 312C, it can be determined whether the calculated accuracy metric meets an accuracy criteria. At 308C, when the accuracy metric meets the accuracy criteria (e.g., the accuracy metric is greater than an accuracy threshold or an error metric is less than the error threshold), no retraining or updated training is triggered in the iteration. At 312C, when the accuracy metric fails to meet the accuracy criteria (e.g., the accuracy metric is less than an accuracy threshold or an error metric is greater than the error threshold), retraining or updated training is triggered.

In some embodiments, the factor value can be initiated at a default value (e.g., per 302B of FIG. 3b, such as a value of 2) and it can be decreased with some fixed value in a feedback iteration (e.g., as illustrated in 302C). In some embodiments, the dynamic selection of points can end when the factor value reaches an end value (e.g., 1, or any other suitable value). The number of data points in the last iteration when factor value reaches this end value can then be used in each upcoming evaluation cycle/feedback iteration.

In some embodiments, the variable number of data points and feedback iterations can be used to arrive at a number of data points (e.g., when the factor value reaches 1) that is suitable for assessing the accuracy of a particular model/machine learning implementation. The number of data points that is determined after performing the iterations is favorable to selection of a static number of data points absent such an iteration cycle at least because the iterations tailor the determined number data points to the particular model/implementation. For example, for different models/implementations, the number of data points determined by the iterations can be different, as the particulars for each model can lend themselves to different end values.

Accordingly, embodiments tailor a number of data points for use in assessing model accuracy to the particular model/implementation for improved performance. This improved performance can include better resource utilization, for example due to improved retraining decisions. The retraining of a model can be triggered based on an assessed accuracy for the model, and thus a number of data points that improves accuracy assessment also improves the retraining decision based on that accuracy assessment.

The following pseudocode represents an example implementation of an embodiment:

```
object ImplicitModelValidator {
/**
 * This value is used as default if the model doesn't have
 * [[IMPLICIT_MODEL_VALIDATION_ENABLED]] key param
 */
    val DEFAULT_IMPLICIT_MODEL_VALIDATION_ENABLED = false
/**
 * This value indicates how much percentage of total points from the model
 * creation time should be considered for
 * accuracy calculation
 */
    val DEFAULT_FRACTION = 0.50
/**
 * Example of minimum points to validate model
 * Note: In some embodiments, all the points from the model
 can take part in the implicit model evaluation
 */
    val MIN_POINTS = 30
/**
 * Tolerance value for the difference in model accuracy and prediction accuracy.
 * Note: If the difference of accuracies crosses this value, then the
 * validator concludes as Training required
 */
    val ACCURACY_TOLERANCE = 0.25
/**
 * Frequency of calling implicit model validation.
 * Note: ImplicitModelValidator can be skipped if the current day is not
 * divisible by this value. The value for
 * eg. 7 means every week the implicit validation of model (implicit
 * feedback) will be executed
 */
    val IMPLICIT_FEEDBACK_SCHEDULE_IN_DAYS = 7
/**
 * This value indicates default factor value & it will be used to adjust the
 * number points considered for trained model validation.
 */
    val DEFAULT_FACTOR_VALUE = 2.0
/**
 * This static value causes the present factor value to decrease
 * using factorValue * stepSize formula. In each iteration, the factor value
 * will be multiplied by this static. The multiplication procedure ends
 * when factor value becomes 1 and the points present at that time will
 * be used for further implicit model evaluation
 */
    val FACTOR_VALUE_STEP_SIZE = 0.95
}
class ImplicitModelValidator(trainedModel: TrainedModel,
    algorithm: AccuracyComputer,
    labelCol: String,
    smallestKPIFrequencyInMs: Long,
    accuracyTolerance: Double =
    ACCURACY_TOLERANCE,
    minPoints: Long = MIN_POINTS,
    implicitFeedbackScheduleInDays: Int =
IMPLICIT_FEEDBACK_SCHEDULE_IN_DAYS,
    currentTimeInMillis: Long =
System.currentTimeMillis( ),
    defaultFraction: Double = DEFAULT_FRACTION
    ) extends SparkLoggable {
...
```

-continued

```
/**
 * This method takes the BOVS dataframe and evaluates the accuracy differences
 * for KPI (actual value) and (predicted value). Data considered forevaluation
 * is always from the trained model creation time.
 * The evaluation can be skipped -
 * a. if the day is other than the schedule days
 * (This is dependent on IMPLICIT_FEEDBACK_SCHEDULE_IN_DAYS) or
 * not multiple of schedule days from the trained model creation time
 * b. if the number of points required are not present
 **@param bovsDF BOVS dataframe filtered using appId
 *@param kpiId kpi id
 *@param predictionId prediction id
 * @return - flag to tell whether the training is required or not.
 * Note: This will be set to false when the
 * implicit model evaluation is skipped
 * - optional accuracy calculated from the actual label and
 * the predicted label
 * - message
 */
def isTrainingRequiredForPrediction(bovsDF: DataFrame,
      kpiId: String,
      prediction Id: String):
      (Boolean, Option[Double], String) = {
      ...
}
```

Referring back to FIG. 1, machine learning model 102 can be designed and trained to perform any type of suitable data predictions. For example, the data predictions generated can relate to a value measured by an Internet of Things ("IoT") connected device, such as a physical measurement (e.g., speed, acceleration, location, a physical property of a physical thing, an amount, or any other suitable physical measurement), measurement in a computing environment or network, and the like. In some examples, the data predictions generated can relate to a value for an enterprise organization, such as a retail sales, inventory, returns, any of these elements within various sub-channels (e.g., different locations, markets, delivery/return channels, such as direct-to-consumer, in-store, third-party, and the like), or any other suitable data for an enterprise organization.

In some embodiments, shipments can be performed according to the machine predictions. For example, the machine predictions can be demand forecasts, inventory predictions, or the like, and, based on the forecasts/predictions, shipments can be executed between a warehouse and a store.

Figure 4:
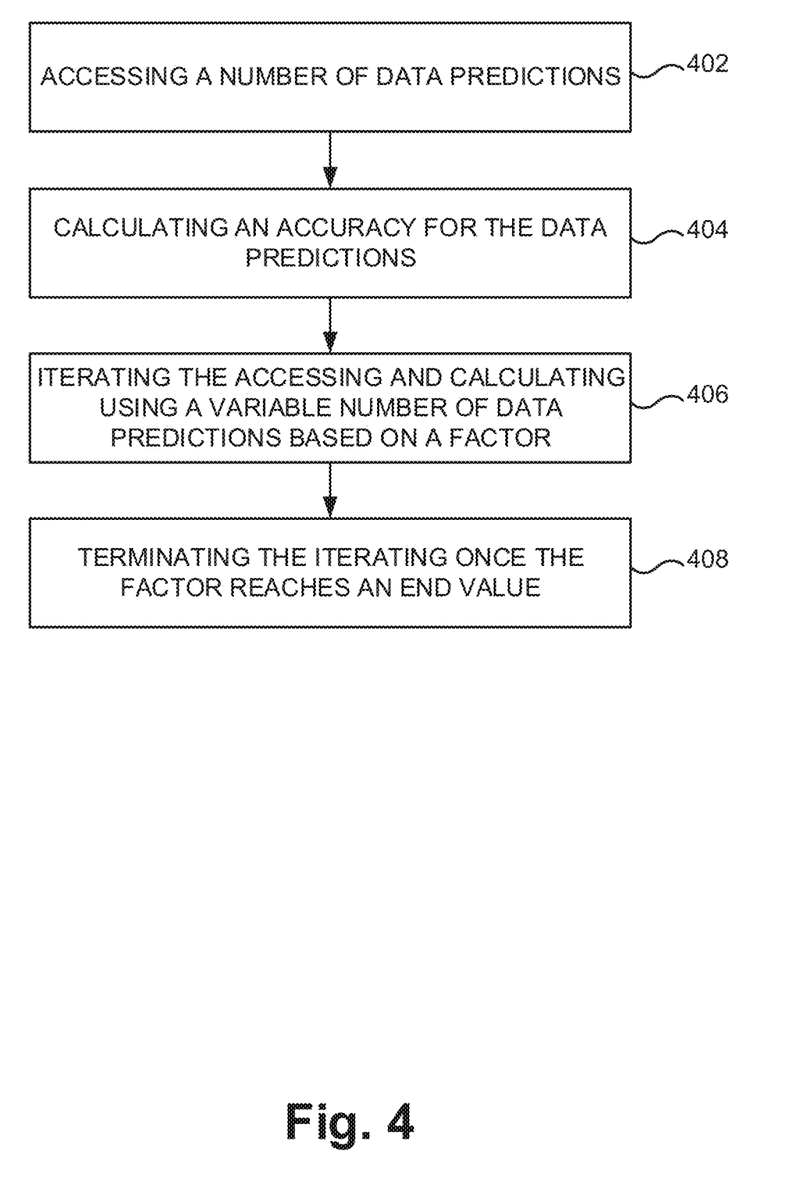
FIG. 4 illustrates a flowchart for dynamic data selection for a machine learning model according to an example embodiment.

FIG. 4 illustrates a flow diagram for implementing a machine learning prediction model with dynamic data point selection according to an example embodiment. At 402 a number of data predictions generated by a trained machine learning model can be accessed, where the data predictions correspond to observed data. For example, data predictions can be generated for data points that are observed at a later point in time. The accessed number of data predictions can have corresponding observed data such that they generate data point pairs.

At 404, an accuracy for the machine learning model can be calculated based on the accessed number of data predictions and the corresponding observed data. For example, the accuracy can be an accuracy metric based on a comparison between the data predictions and their corresponding observed data.

At 406, the accessing and calculating can be iterated using a variable number of data predictions, where the variable number of data predictions is adjusted based on an action taken during a previous iteration, and when the calculated accuracy fails to meet an accuracy criteria during a given iteration, a training for the machine learning model is triggered. For example, a plurality of iterations can be performed over an amount of time according to a period for the iterations.

In some embodiments, the variable number of data predictions for a current iteration can be adjusted based on whether training was triggered during the previous iteration. In some embodiments, the previous iteration is an iteration directly preceding the current iteration.

In some embodiments, the number of data predictions for the current iteration is increased when training was triggered during the previous iteration and the number of data predictions is decreased when training was not triggered during the previous iteration. For example, the number of data predictions for the current iteration is multiplied by a factor when training was triggered during the previous iteration and the number of data predictions is divided by a factor when a training was not triggered during the previous iteration. In some embodiments, the value for the factor is decreased over a plurality of iterations. In an example, a value for the factor is initialized and the factor has a value greater than or equal to one.

In some embodiments, the triggered training can be a retraining or updated training for the trained machine learning model. In some embodiments, when training is triggered, next iterations of the accessing and calculating use data predictions generated by the machine learning model generated by the triggered training.

In some embodiments, the iterating is performed according to a predetermined period. For example, the predetermined period can be a predetermined period of time or a predetermined amount of data predictions that have corresponding observed data.

At 408, the accessing and calculating using the variable number of data predictions can be terminated after performing a plurality of the iterations such that a configured number of data predictions is determined based on the iterating, where, after the iterating, the configured number of data predictions is used to calculate an accuracy for the machine learning model and the accuracy is used to trigger training of the machine learning model.

Embodiments can improve conventional approaches to forecasting solutions by providing enterprises (e.g., retailers) a mechanism to use improved machine learning models for forecast accuracy of a demand forecast. In many situations, the demand forecast is a driver of the supply chain, and, if it is inaccurate, allocation, planning and replenishment perform poorly, resulting in inefficient resource usage. In general, if the forecast is high, items will remain unsold; they either need to be sold at a discount, or wastage increases. If the forecast is low, demand is not satisfied and retailers experience lost sales and low client satisfaction. Both cases result in inefficient resource usage. Embodiments provide techniques for achieving a reliable demand forecast and thus improve the efficiency of resource utilization in the supply chain and across the enterprise.

Figure 5:
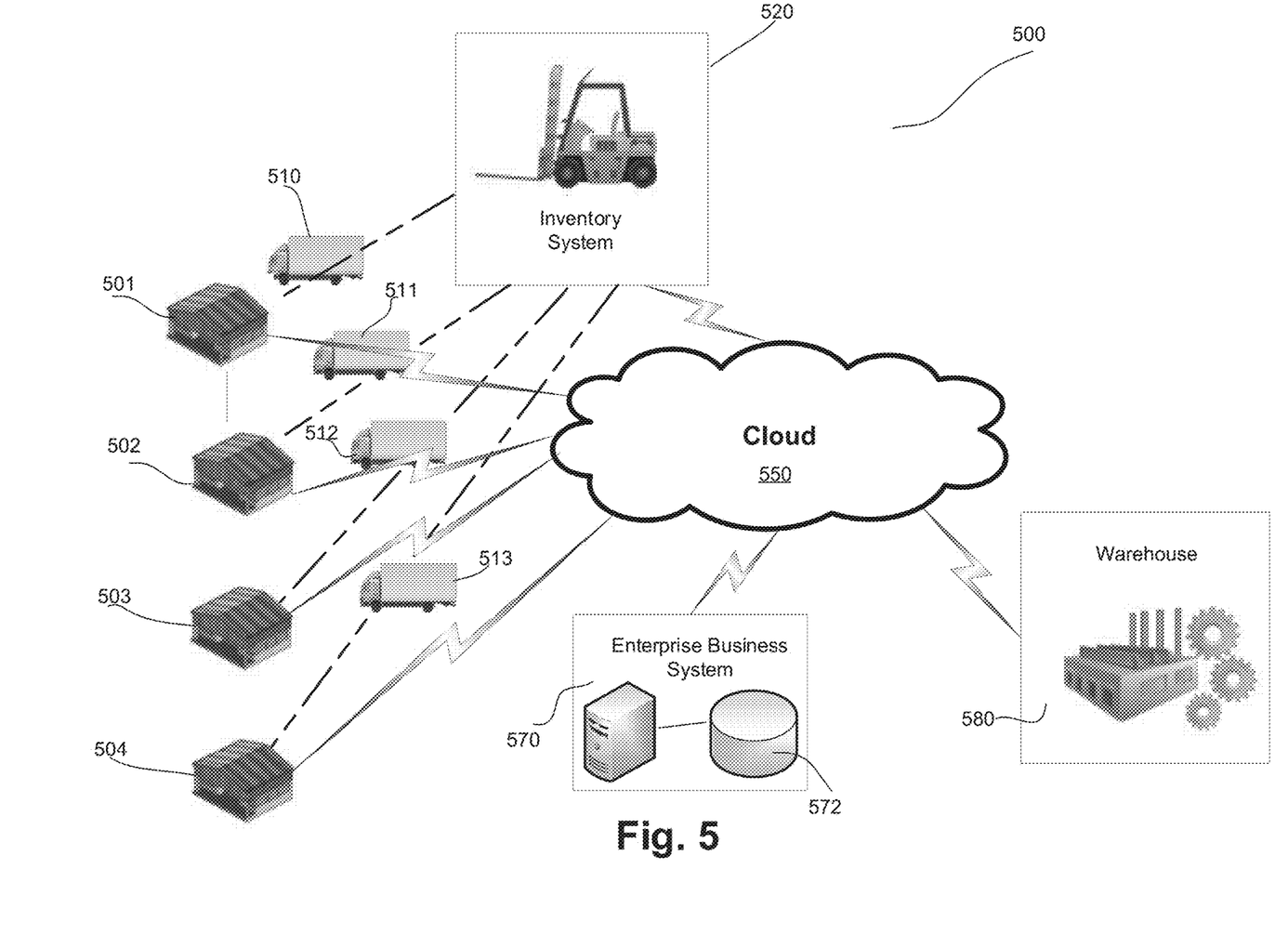
FIG. 5 illustrates an integrated supplier, inventory, and logistics system that includes improved planning and supply actions as disclosed herein according to an example embodiment.

FIG. 5 illustrates an integrated supplier, inventory, and logistics system that includes stock management as disclosed herein according to an example embodiment. As shown in FIG. 5, system 500 can include an enterprise business system 570 that executes code to manage stock of products for enterprise locations 501-504 using warehouse 580, and to ship products from warehouse 580 directly to consumers. Enterprise business system 570 is in communication through a cloud network 550 or other type of communications network with one or more inventory system 520. In some embodiments, planning and forecasting software of enterprise business system 570 can generate a forecast that provides forecasted inventory levels for a variety of products. Inventory system 520 and warehouse 580 can execute shipments to and from enterprise locations 501-504 based on these forecasted inventory levels. In some embodiments, the use of a trained machine learning model can provide improvements to these forecasted inventory levels, thus generating a more efficient shipment process.

Inventory system 520 stores inventory and provides transportation logistics to deliver items to enterprise locations 501-504 and to consumer locations (e.g., consumer homes) using trucks 510-513 or some other transportation mechanisms. Inventory system 520 in one embodiment implements an Enterprise Resource Planning ("ERP") specialized computer system or a specialized inventory control system that uses input from enterprise business system 510, such as an in-season plan generated by planning and forecasting software, to determine levels of inventories and the amount and timing of the delivery of products to enterprise locations 501-504.

Warehouse 580 can be a fulfilment warehouse that supplies one or more products to enterprise locations 501-504 based on inventory system 520 and that ships products to consumer locations (e.g., consumer homes). Warehouse 580 in one embodiment implements an ERP specialized computer system or a specialized supplier system that uses input from enterprise business system 510, such as an in-season plan generated by planning and forecasting software, to determine an amount of and timing for product shipments to inventory system 520 and/or enterprise locations 501-504. In some embodiments, for instance based on returns to enterprise locations 501-504, warehouse 580 may receive shipments form enterprise locations, for instance to ensure the enterprise locations are not oversupplied and have sufficient product variety.

Embodiments perform dynamic data selection for a machine learning model. In some embodiments, training data can be used to train a machine learning model (e.g., via supervised learning). The trained model can then be used to generate data predictions based on input data. At times, a trained machine learning model can be updated, for example by retraining the model or updating the training.

In some embodiments, an accuracy metric can be used to trigger retraining or updated training. For example, some implementations of a trained machine learning model generate data predictions of a data point that is observed some time in the future. As such, past data predictions can include corresponding observed data points. An accuracy metric based on these two values can be used to trigger retraining or updated training. For example, the accuracy metric can be compared to an accuracy criteria, and based on the comparison, training can be triggered.

In some embodiments, the number of past data predictions and corresponding observed data point pairs can influence the accuracy metric. For example, a set of these data point pairs can be generated as observed data becomes available. The accuracy determination can be dependent on the number of these data point pairs that are selected. A large number of data point pairs can dilute the significance of any particular subset of these data points. For example, when a month of data point pairs is used to determine accuracy, the last week of data point pairs is diluted by the other days of the month. In another example, when two weeks of data point pairs is used to determine accuracy, the last week of data point pairs has great significance to the accuracy metric.

In some implementations, where a first number of data point pairs is smaller than a second number of data point pairs, an accuracy metric based on the first number is more likely to trigger retraining or updated training than an accuracy metric based on the second number. In other words, in some implementations a smaller number of data point pairs is more likely to generate an accuracy metric that fails to meet the accuracy criteria, and thus trigger retraining or updated training.

The training of a machine learning model can be resource intensive, and thus selectively retraining or updating the training of a machine learning model can balance accuracy with resource efficiency and practicality. Embodiments iteratively calculate an accuracy metric using a variable number of data point pairs, and retraining or updated training can be triggered at a given iteration when the accuracy metric fails to meet an accuracy criteria.

For example, at a given iteration, the number of data point pairs can be based on the previous number of data point pairs (e.g., used in the previous iteration), a factor value (e.g., a dynamic value that is adjusted over iterations), and the status of the last retraining or updated training (e.g., whether the model was retrained or updated training took place in the previous iteration). Accordingly, over the iterations, the number of data point pairs that are used to assess accuracy changes, and thus the likelihood of triggering retraining or updated training changes. This configured likelihood improves the implementation as a whole by balancing prediction accuracy with resource usage and system disruption.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for implementing a machine learning prediction model with dynamic data selection, the method comprising:
  accessing a number of data predictions comprising predictions of data points, the data predictions being generated by a trained machine learning model deployed at a deployment time, wherein actual data values that correspond to the data points of the data predictions are stored;
  calculating an accuracy for the machine learning model based on the accessed number of data predictions and the corresponding actual data values;
  iterating the accessing and calculating using a variable number of data predictions, wherein,
    a defined algorithm automatically adjusts the variable number of data predictions that are used to calculate the accuracy of the machine learning model between successive iterations, the variable number of data predictions between successive iterations being adjusted by a delta value that is calculated by applying a factor value;
    when the iterating begins the factor value is a numeric value greater than one, and the factor value per iteration is systematically decreased number of iterations increases relative to the deployment time;
    for a given iteration of the iterations, the defined algorithm applies a factor value for the given iteration using a first application type to calculate the delta value when training was triggered for an iteration prior to the given iteration, and the defined algorithm applies the factor value for the given iteration using a second application type to calculate the delta value when training was not triggered for the iteration prior to the given iteration; and
    when the calculated accuracy during the given iteration fails to meet an accuracy criteria, a training for the machine learning model is triggered;
  terminating, in response to the factor value meeting a criteria value, the iterating of the accessing and calculating such that a configured number of data predictions is determined based on the iterations, wherein training of the machine learning model is triggered by multiple of the iterations; and
  generating, using the machine learning model after the terminating, additional predictions, wherein the configured number of data predictions is used to calculate an accuracy for the additional predictions and the calculated accuracy of the additional predictions is used to trigger training of the machine learning model.

2. The method of claim 1, wherein the iteration prior to the given iteration comprises an iteration directly preceding the given iteration.

3. The method of claim 1, wherein the triggered training comprises a retraining or updated training for the trained machine learning model.

4. The method of claim 1, wherein, when training is triggered, next iterations of the accessing and calculating use data predictions generated by the machine learning model generated trained via by the triggered training.

5. The method of claim 1, wherein the iterating is performed according to a predetermined period, and the predetermined period is a predetermined period of time or a predetermined amount of data predictions that have corresponding actual data values.

6. The method of claim 1, wherein the variable number of data predictions for the given iteration is increased when training was triggered during the iteration prior to the given iteration and decreased when training was not triggered during the iteration prior to the given iteration.

7. The method of claim 1, wherein,
  the variable number of data predictions for the given iteration is based on the variable number of data predictions for the iteration prior to the given iteration;
  the variable number of data predictions for the given iteration comprises the variable number of data predictions for the iteration prior to the given iteration multiplied by the factor value for the given iteration when training was triggered during the iteration prior to the given iteration; and
  the variable number of data predictions for the given iteration comprises the variable number of data predictions for the iteration prior to the given iteration divided by the factor value for the given iteration when a training was not triggered during the iteration prior to the given iteration.

8. A system for implementing a machine learning prediction model with dynamic data selection, the system comprising:
  a processor; and
  a memory storing instructions for execution by the processor, the instructions configuring the processor to:
    access a number of data predictions comprising predictions of data points, the data predictions being generated by a trained machine learning model deployed at a deployment time, wherein actual data values that correspond to the data points of the data predictions are stored;
    calculate an accuracy for the machine learning model based on the accessed number of data predictions and the corresponding actual data values;
    iterate the accessing and calculating using a variable number of data predictions, wherein,
      a defined algorithm automatically adjusts the variable number of data predictions that are used to calculate the accuracy of the machine learning model between successive iterations, the variable number of data predictions between successive iterations being adjusted by a delta value that is calculated by applying a factor value;
      when the iterating begins the factor value is a numeric value greater than one, and the factor value per iteration is systematically decreased as a number of iterations increases relative to the deployment time;
      for a given iteration of the iterations, the defined algorithm applies a factor value for the given iteration using a first application type to calculate the delta value when training was triggered for an iteration prior to the given iteration, and the defined algorithm applies the factor value for the given iteration using a second application type to calculate the delta value when training was not triggered for the iteration prior to the given iteration; and when the calculated accuracy during the given iteration fails to meet an accuracy criteria, a training for the machine learning model is triggered;

terminate, in response to the factor value meeting a criteria value, the iterating of the accessing and calculating such that a configured number of data predictions is determined based on the iterations, wherein training of the machine learning model is triggered by multiple of the iterations; and generate, using the machine learning model after the terminating, additional predictions, wherein the configured number of data predictions is used to calculate an accuracy for the additional predictions and the calculated accuracy of the additional predictions is used to trigger training of the machine learning model.

9. The system of claim 8, wherein the iteration prior to the given iteration comprises an iteration directly preceding the given iteration.

10. The system of claim 9, wherein the iterating is performed according to a predetermined period, and the predetermined period is a predetermined period of time or a predetermined amount of data predictions that have corresponding actual data values.

11. The system of claim 10, wherein the variable number of data predictions for the given iteration is increased when training was triggered during the iteration prior to the given iteration and the variable number of data predictions is decreased when training was not triggered during the iteration prior to the given iteration.

12. A non-transitory computer readable medium having instructions stored thereon that, when executed by a processor, cause the processor to implement a machine learning prediction model with dynamic data selection, wherein, when executed, the instructions cause the processor to:

access a number of data predictions comprising predictions of data points, the data predictions being generated by a trained machine learning model deployed at a deployment time, wherein the data predictions comprise corresponding actual data values of the data points;

calculate an accuracy for the machine learning model based on the accessed number of data predictions and the corresponding actual data values;

iterate the accessing and calculating using a variable number of data predictions, wherein, a defined algorithm automatically adjusts the variable number of data predictions that are used to calculate the accuracy of the machine learning model between successive iterations, the variable number of data predictions between successive iterations being adjusted by a delta value that is calculated by applying a factor value;

when the iterating begins the factor value is a numeric value greater than one, and the factor value per iteration is systematically decreased as a number of iterations increases relative to the deployment time; and for a given iteration of the iterations, the defined algorithm applies a factor value for the given iteration using a first application type to calculate the delta value when training was triggered for an iteration prior to the given iteration, and the defined algorithm applies the factor value for the given iteration using a second application type to calculate the delta value when training was not triggered for the iteration prior to the given iteration, when the calculated accuracy during the given iteration fails to meet an accuracy criteria, a training for the machine learning model is triggered;

terminate, in response to the factor value meeting a criteria value, the iterating of the accessing and calculating such that a configured number of data predictions is determined based on the iterations, wherein training of the machine learning model is triggered by multiple of the iterations; and generate, using the machine learning model after the terminating, additional predictions, wherein the configured number of data predictions is used to calculate an accuracy for the additional predictions and the calculated accuracy of the additional predictions is used to trigger training of the machine learning model.

13. The method of claim 1, wherein applying the factor value for the given iteration using the first application type calculates a delta value that increases the variable number of data points between the iteration prior to the given iteration and the given iteration, and applying the factor value for the given iteration using the second application type calculates a delta value that decreases the variable number of data points between the iteration prior to the given iteration and the given iteration.

14. The system of claim 8, wherein applying the factor value for the given iteration using the first application type calculates a delta value that increases the variable number of data points between the iteration prior to the given iteration and the given iteration, and applying the factor value for the given iteration using the second application type calculates a delta value that decreases the variable number of data points between the iteration prior to the given iteration and the given iteration.

15. The method of claim 1, wherein the factor value per iteration is systematically decreased as the number of iterations increases relative to the deployment time by applying a step value to the factor value between successive iterations.

16. The method of claim 15, wherein applying the step value to the factor value over the iterations decreases the factor value to the criteria value or below the criteria value by a time when the iterating is terminated.

17. The method of claim 15, wherein the step value is a numeric value less than one and applying the step value to the factor value comprises multiplying the factor value by the step value.

18. The method of claim 1, wherein the machine learning model comprises a demand forecast model, the generated additional predictions comprise demand forecasts, and product shipments are executed in response to the generated additional predictions.

19. The system of claim 8, wherein the factor value per iteration is systematically decreased as the number of iterations increases relative to the deployment time by applying a step value to the factor value between successive iterations.

20. The system of claim 19, wherein applying the step value to the factor value over the iterations decreases the factor value to the criteria value or below the criteria value by a time when the iterating is terminated.

* * * * *